United States Patent [19]

Fry

[11] Patent Number: 4,712,844

[45] Date of Patent: Dec. 15, 1987

[54] HOME FILING CABINET

[75] Inventor: John A. Fry, Lindenhurst, Ill.

[73] Assignee: Quaker Industries, Inc., Antioch, Ill.

[21] Appl. No.: 878,295

[22] Filed: Jun. 25, 1986

[51] Int. Cl.$^4$ .............................................. A47B 43/00
[52] U.S. Cl. ................................ 312/265; 312/330 R; 312/257 SM
[58] Field of Search ............ 312/265, 257 SM, 330 R, 312/350

[56] References Cited

U.S. PATENT DOCUMENTS

| | | | |
|---|---|---|---|
| 2,137,142 | 11/1938 | Nelson, Jr. et al. | 312/265 |
| 3,879,096 | 4/1975 | Blodee | 312/265 |
| 3,964,811 | 6/1976 | McCelland | 312/265 |
| 4,047,777 | 9/1977 | Pfeifer | 312/265 |
| 4,232,920 | 11/1980 | Bukaitz | 312/257 SM |
| 4,295,693 | 10/1981 | Viklund | 312/257 SM |
| 4,497,524 | 2/1985 | Leving, Jr. et al. | 312/265 |
| 4,563,040 | 1/1986 | Alster | 312/265 |

*Primary Examiner*—James T. McCall
*Attorney, Agent, or Firm*—Trexler, Bushnell, Giangiorgi & Blackstone, Ltd.

[57] ABSTRACT

An easily-assembled knock-down home filing cabinet comprises a generally rectangular top panel, a pair of generally rectangular opposite side panels engaged at respective upper margins of the top panel in a parallel and spaced apart condition, and a plurality of elongate tie rods spanning and joining the side panels intermediate areas thereof located generally adjacent respective corners thereof for maintaining the side panels in the desired parallel and spaced apart condition so as to define, with the top panel, a generally rectilinear cabinet for receiving at least one file drawer. Each of the tie rods comprises an elongate rod-like member having at least one threaded end and a complementary mating threaded fastener for threaded engagement with each rod threaded end and for engagement with an adjacent side panel.

A drawer for a filing cabinet comprises respective rear and front, bottom and opposite side panels, and an arrangement joining the respective panels together to form a generally rectilinear drawer. The joining arrangement however, includes a marginal web portion at a bottom edge of each side panel formed at generally right angles thereto and a reversely bent gripping portion formed at each of opposite side margins of the bottom panel for slidably receiving and engaging one of the side panel web portions therein.

20 Claims, 15 Drawing Figures

HOME FILING CABINET

BACKGROUND OF THE INVENTION

This invention is directed generally to furniture items of the type made of preformed panels or the like, and more particularly to a relatively simple and easily assembled, knock-down home filing cabinet.

Partially or fully prefabricated or pre-assembled furniture for the home or office is generally well-known. In particular, filing cabinets or other similar items of office furniture, are usually provided to the user in fully assembled form, and are made of many materials, such as wood, metal, composition materials and the like. However, particularly with respect to filing cabinets, commercial or office type filing cabinets currently in use are of relatively heavy, welded metal construction to withstand the rigors of commercial use. Hence such filing cabinets are generally not provided in relatively light weight knock-down form for assembly by the user. Rather they require assembly in a factory or the like utilizing relatively skilled workers, and welding equipment or other relatively expensive or complicated tools and the like.

As a result of this relatively heavy construction, pre-assembled form and the need for factory assembly, such filing cabinets have heretofore been relatively expensive at the retail or wholesale level. On the other hand, many consumers desire a relatively less expensive, home-type of filing cabinet or other similar office type furniture for home use only. Generally speaking, such furniture need not be as heavily constructed, since the typical home use is considerably less demanding on the furniture structurally. Moreover, such filing cabinets or other furniture may also be provided at relatively lesser cost if they are wholly or partly knocked down for final assembly by the consumer. Additionally, the use of relatively simpler and lighter weight components in the construction minimizes the shipping weight of such items, and hence can further minimize the end cost to the consumer.

As a related matter, such relatively inexpensive knock-down furniture for home use should also be relatively simple to assemble. That is, the parts thereof should be held to but a minimum of parts which are relatively simple to fit together and assemble, preferably using fasteners or other means of joining which can be accomplished by the unskilled consumer. Moreover, such assembly should require the use of only a relatively few, simple tools of the type normally found in the home, so as to be most easily assembled by the consumer. However, the assembled filing cabinet or other furniture item should be relatively sturdy and reliable in service, once assembled.

OBJECTS OF THE INVENTION

Accordingly, it is a general object of the invention to provide a relatively easily assembled, knock-down home filing cabinet or similar item of furniture.

A related object is to provide a home filing cabinet or the like in accordance with the foregoing object which comprises a minimum of simple and readily interfitted parts so as to be readily assembled even by a relatively unskilled person, using a minimum of tools, and preferably only a common screwdriver.

A related object is to provide a home filing cabinet or the like in accordance with the foregoing objects which is relatively simple and inexpensive in its design and construction and yet relatively sturdy and reliable in use over a relatively long service life.

BRIEF DESCRIPTION OF THE DRAWINGS

The features of the present invention which are believed to be novel are set forth with particularity in the appended claims. The organization and manner of operation of the invention together with further objects and advantages thereof, may best be understood by reference to the following description taken in connection with the accompanying drawings in the several figures in which like reference numerals identify like elements, in which:

DETAILED DESCRIPTION OF THE ILLUSTRATED EMBODIMENT

Figure 1:
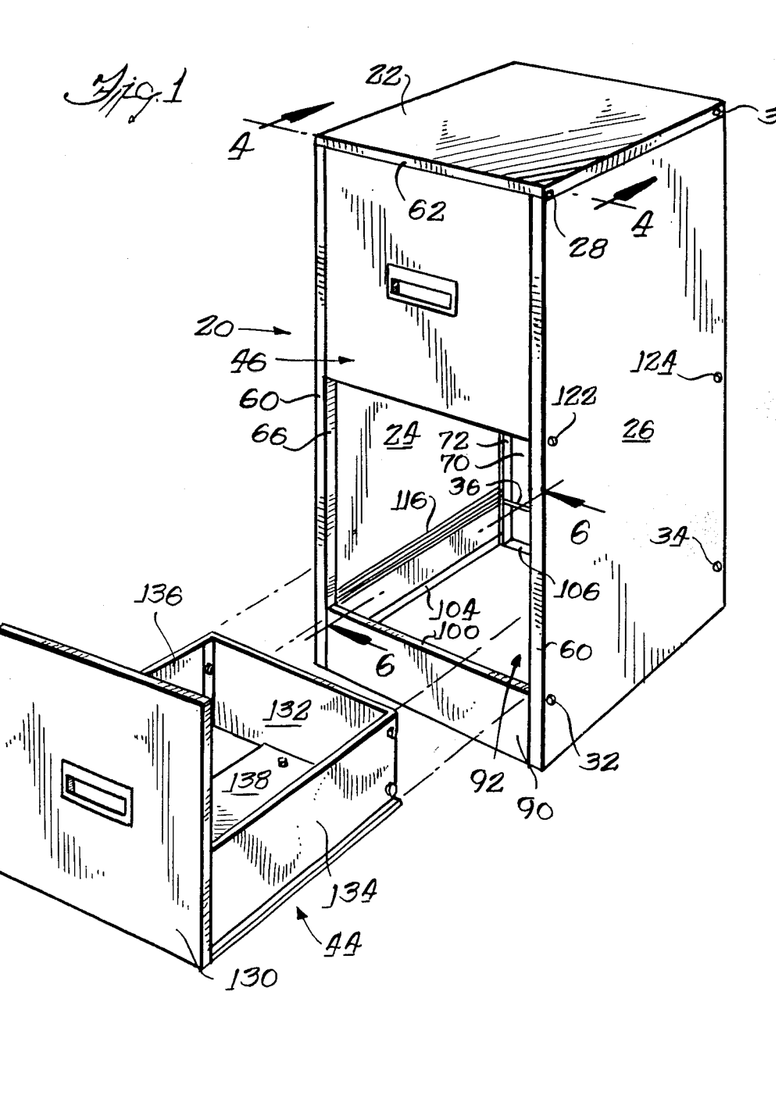
FIG. 1 is a partially exploded perspective view of an assembled home filing cabinet in accordance with the present invention.
Figure 2:
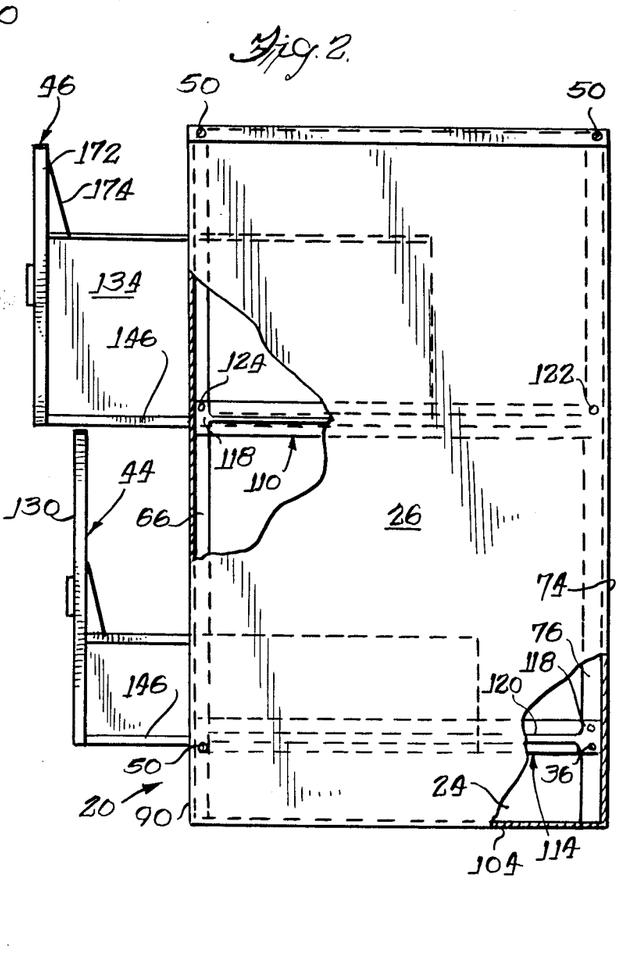
Fig 2 is a side elevation of the filing cabinet of FIG. 1, partially broken away and partially in section.
Figures 7, 8:
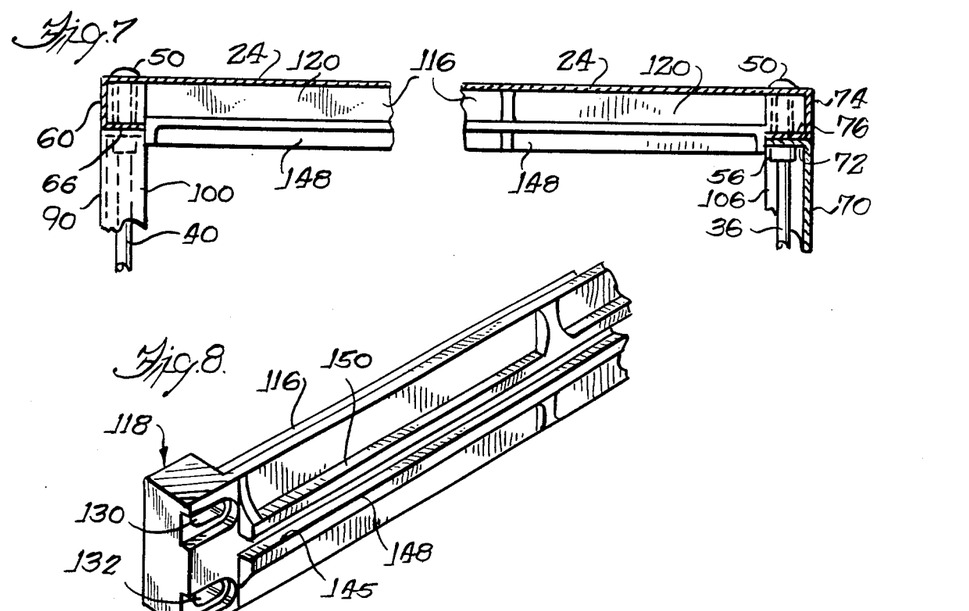
FIG. 7 is a partial sectional view taken generally in the plane of the line 7—7 of FIG. 6.
FIG. 8 is an enlarged partial perspective view illustrating one end portion of a guide member of the filing cabinet of the invention.
Figures 9, 10:
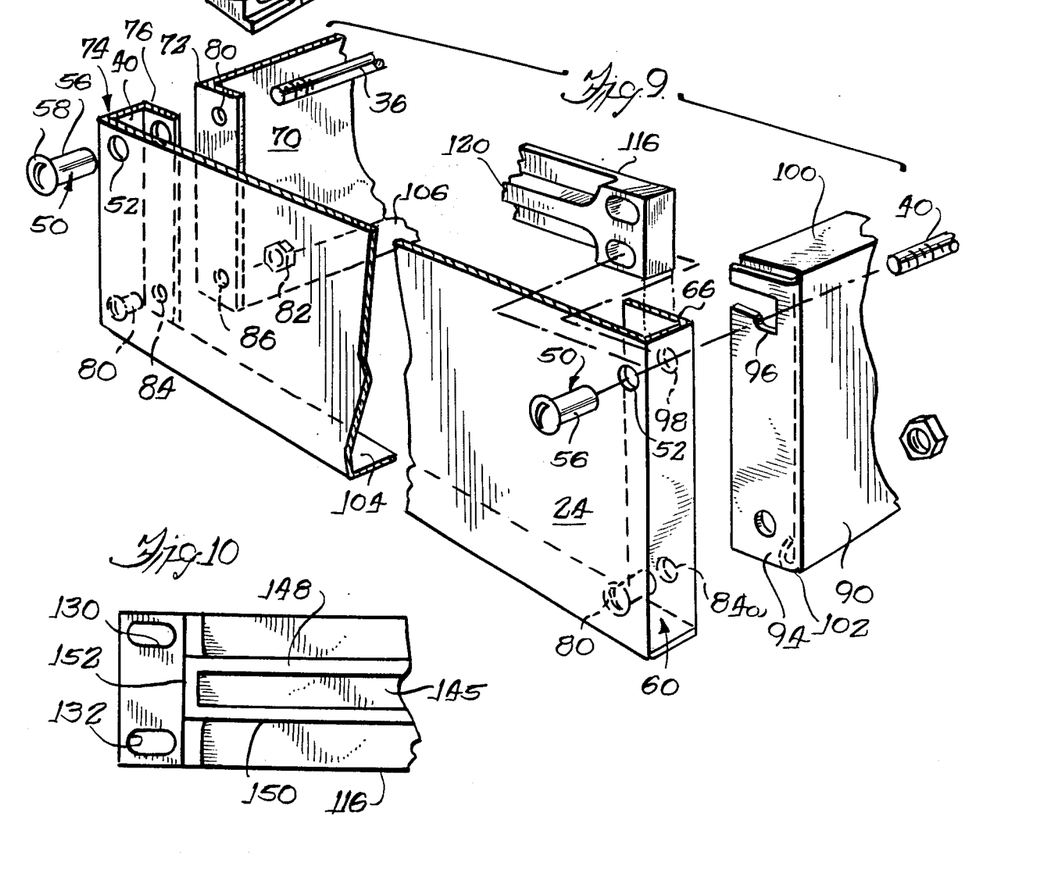
FIG. 9 is a partial, exploded perspective view illustrating assembly of a bottom portion of the filing cabinet of FIG. 1.
FIG. 10 is a partial plan view of an opposite end portion of the guide member of FIG. 8.
Figure 11:
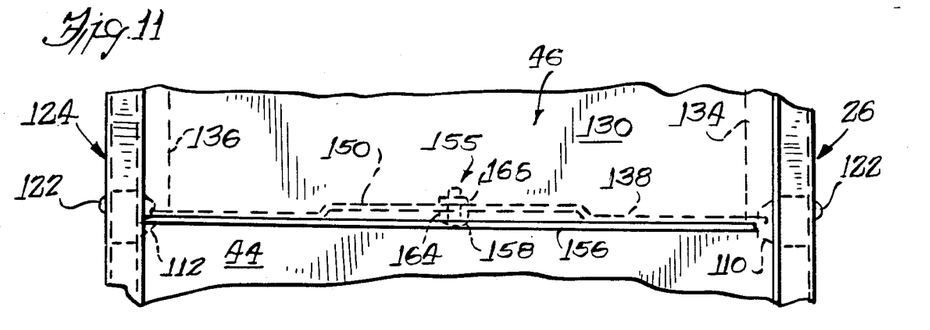
FIG. 11 is an enlarged partial front plan view of the filing cabinet, similar to FIG. 3 and illustrating further of a portion thereof.

Referring now to the drawings, and initially to FIGS. 1–5, an easily assembled, knock-down file cabinet is designated generally by the reference numeral 20. This filing cabinet 20 is generally rectilinear in form, as defined and constructed from a generally rectangular top panel 22 and a pair of generally rectangular opposite side panels 24, 26 which are engaged at respective upper margins of the top panel in a generally spaced apart parallel condition. As indicated by phantom line in FIG. 3 and as more fully shown in FIGS. 4, 5 and 7, in accordance with one feature of the invention, a plurality of elongate tie rod means or members span and join these side panels 24 and 26. More particularly these elongate tie rod means or members 36, 38, 40 and 42 span and join the side panels intermediate areas thereof located generally adjacent the respective four corners thereof as indicated generally at reference numerals 28, 30, 32 and 34 of FIG. 1. A portion of one of these tie rods 36 is visible in the view of FIG. 1. Additional tie rods 38 and 40 are shown in phantom line in FIG. 2, with portions of tie rod 38 being additionally shown in FIGS. 4 and 5. Additionally portions of tie rods 36 and 40 are illustrated in FIGS. 7 and 9, which will be more fully described hereinbelow. It will be understood that the fourth tie rod 42, not fully illustrated in the drawings, joins the upper rear corner portions of side panels 24 and 26 as generally indicated in FIG. 1 at reference numeral 30.

Figures 3, 5:
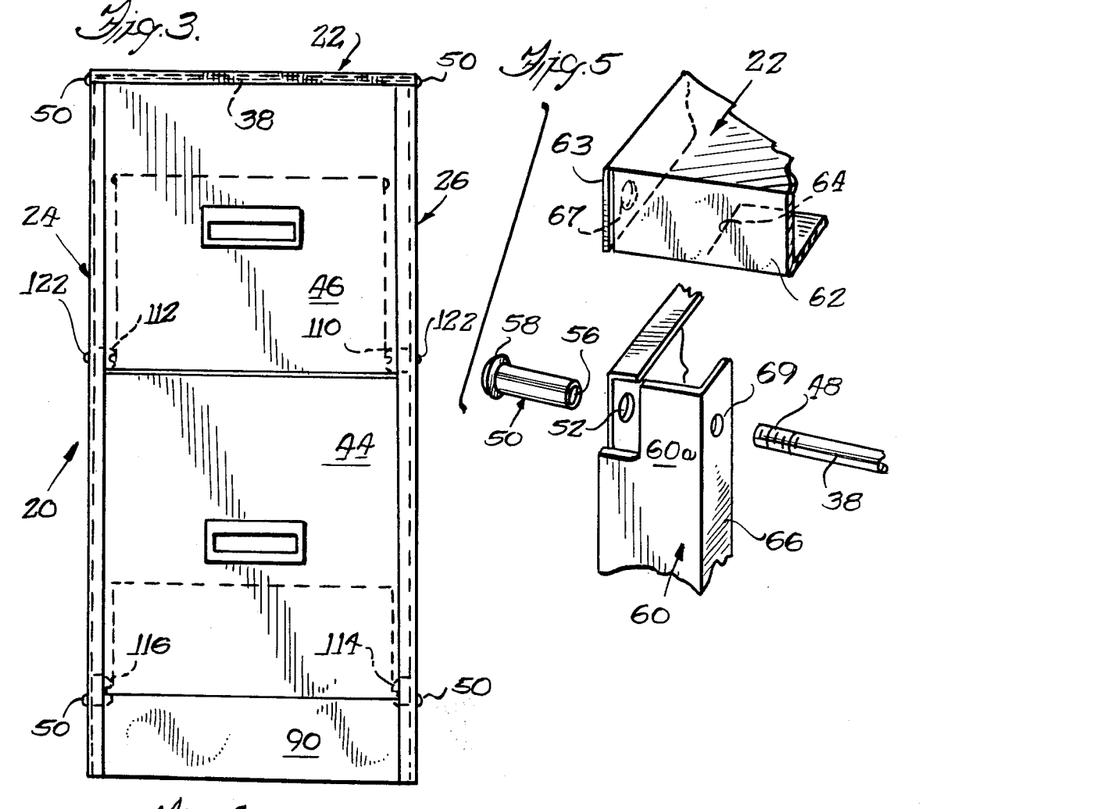
FIG. 3 is a front plan view of the assembled filing cabinet of FIG. 1.
FIG. 5 is an enlarged partial, exploded perspective view illustrating assembly of the top corner portion of the filing cabinet of the invention.
Figure 4:
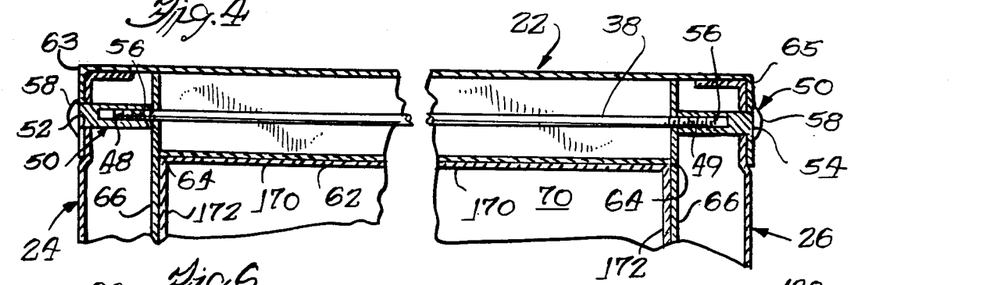
FIG. 4 is an enlarged partial sectional view taken generally in the plane of the line 4—4 of FIG. 1.
Figure 6:
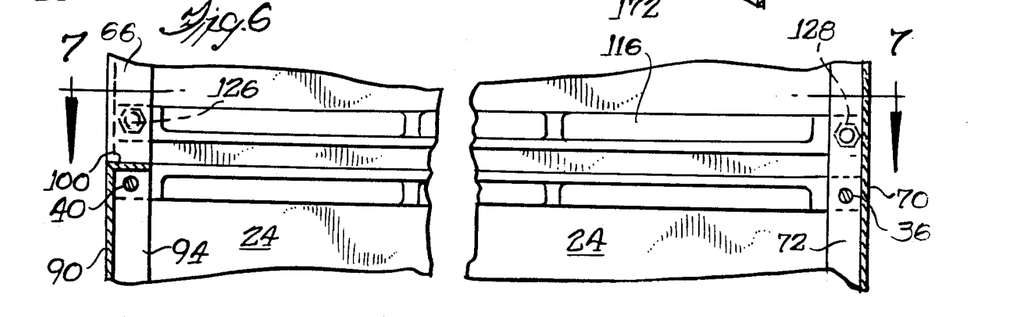
FIG. 6 is an enlarged, partial sectional view taken generally in the plane of the line 6—6 of FIG. 1.

The tie rods serve to secure and maintain the side panels in the desired parallel and spaced apart condition so as to define, together with the top panel, the generally rectilinear cabinet 20 for receiving at least one file drawer 44. In the illustrated embodiment two similar file drawers 44 and 46 are provided, as will be more fully described hereinbelow. Each of the tie rod means or members is substantially identical in form, such that only one of the tie rods 38 will be fully described herein. Referring to FIGS. 4 and 5, the tie rod 38 will be seen to comprise a generally elongate rod-like member having at least one threaded end 48. A complementary mating fastener 50 is provided for threaded engagement with each rod threaded end such as end 48, and also for engagement with an adjacent side panel such as side panel 24 shown in FIG. 5.

In the illustrated embodiment the elongate rod-like members are threaded at both ends, as indicated generally at reference numerals 48 and 49 of the rod 38 in FIG. 4. Accordingly, a pair of the threaded mating fasteners 50 is provided, one for engagement with each of these threaded ends. Moreover, the side panels 26 and 28 include fastener-receiving means, which in the illustrated embodiment comprise aligned through apertures 52, 54, at areas adjacent each of the corners thereof for receiving and engaging the mating fasteners 50. Preferably each of the mating fasteners 50 includes an elongate, tubular internally threaded portion 56 for engagement with the threaded rod end, and also for insertion through the respective aligned through apertures of the side panels, and an enlarged head portion 58. The enlarged head portions 58 are sized for engagement with the exterior surfaces of the side panels about the respective through apertures. Accordingly, each of the areas 28, 30, 32 and 34 indicated adjacent the corners of panel 26 in FIG. 1, mounts a fastener 50.

Additional retaining means or structure is provided for maintaining the top panel 22 and side panels 24, 26 in the desired alignment to define the generally rectilinear cabinet 20 and to hold the same in a relatively rigid, assembled condition. These retaining means include respective reversely bent lip portions 60, 62 at the respective aligned front margins of the top and side panels, as best viewed in FIGS. 4 and 5. The respective lateral outer edges of the lip portion 62 of the top panel are cut away, as indicated in phantom line, to define abutment surfaces 64 for engagement with facing surfaces 66 of the respective side panel lip portions to either side thereof. This arrangement holds the respective side panel lip surfaces 66 spaced apart by an amount corresponding to and in part defining, the spacing between the side panels 24, 26 of the assembled cabinet 20.

The top panel 22 also preferably has opposite downwardly bent side margins or lip portions 63, 65 which overlie outer surfaces of top margins of the side panels 24, 26. These margins 63, 65 thus cooperate with edges 64 to position the sides relative to the top panel. Aligned through apertures 67 in these margins 63, 65 receive fasteners 50.

The retaining means for defining the rectilinear form of the assembled cabinet also includes a generally rectangular rear panel 70 engaged at a top margin thereof with the top panel and at opposite side margins thereof with the side panels for generally holding the edges of the top and side panels in the desired relative orientation. Preferably, as best viewed in FIG. 9, the rear panel has inwardly bent lips 72 at opposite side margins thereof for attachment with the respective side panels 24, 26. Cooperatively, the side panels 24 and 26 have reversely bent lips 74 similar to the lips 60 at their front margins, discussed above for engagement with lips 72 of rear panel 70. Suitable fasteners such as screws 80 and mating nuts 82 may be provided at desired intervals along these engaged lips 72 and 74, which have aligned through apertures 84, 86 provided for this purpose. Additionally, as shown in FIGS. 4 and 9 at the top and bottom portions of the cabinet, the mating fasteners 50 enter each of the through apertures 52 provided therefor in the side panel to receive threaded rod ends 48, 49. The respective rods extend through aligned through apertures 86, 88 in the lips 60 and 72 and in surface 76 of lip 74, respectively. Preferably, however, only the tie rods and associated fasteners are utilized to secure the rear and side panels in this fashion, the additionally illustrated fasteners 80, 82 and receiving through apertures being illustrated as an optional additional fastening means to be used, if desired.

As also best viewed in FIG. 9, the retaining means for retaining the cabinet in its desired rectilinear or assembled state also includes a generally rectangular front kick plate 90, spanning the side panels at a lower front portion thereof. Together with the top and side panels, kick plate 90 also defines a large, generally rectangular opening 92 for receiving one or more drawers 44, 46 in the cabinet 20. As shown in FIG. 9, the front kick plate 90 includes inwardly bent side margins or lips 94 which abut or engage surfaces 66 of the respective front panel reversely bent lip portions 60. Tie rod 40 preferably extends through apertures 96 provided in lips 94 and aligned through apertures 98 in surfaces 66 to either side for engagement with mating fasteners 50 which extend through side panel apertures 52 for this purpose.

Preferably, the elongate bodies 56 of fasteners 50 are of sufficient length to extend through respective aligned apertures 52, 88 and 52, 98 in the side panels 24, 26. An additional fastening means such as a further threaded fastener 80 and nut 82 similar to those described above may also be utilized to further secure the aligned edges or lips 94 and 66 at aligned through apertures 84a, 86a. Alternatively, other fasteners, for example sheet metal screws may be utilized to secure the panels at aligned apertures 84a, 86a. Preferably, kick plate 90 also has an inwardly bent top margin or lip 100 and an upwardly bent lip portion 102 at respective top and bottom margins thereof to align with a bottom surface of drawer 44 and provide a relatively smooth bottom surface of the cabinet 20, respectively.

In this latter regard, in the illustrated embodiment, no bottom panel is provided for the cabinet 20. Accordingly, the bottom edges of the side panels 24, 26 and of rear panel 70 are also provided with inwardly bent lips or margins 104, 106 to present a relatively smooth edge surface to a floor or other surface upon which the file cabinet is placed, avoiding any protruding sharp edges or the like. Preferably, the through aperture 96 in lip 94 of a kick plate 90 is generally L-shaped and open ended to permit assembly of kick plate with the cabinet following the placement and securing of tie rod 40 and its respective mating end fasteners 50.

In accordance with a further feature of the invention, pairs of parallel aligned guide members 110, 112 and 14, 116 are provided for slidably mounting or receiving drawers 44, 46 in cabinet 20. These guide members are substantially identical, whereby only one such guide member 116 is fully illustrated and described herein. Referring now also to FIGS. 6–10, it will be seen that the guide member 116 is advantageously configured to interfit within the reversely bent lip portions 60 and 74 of the respective side panels 24, 26. In this regard, each of these reversely bent lip portions 60 and 74 comprises a first web 60a, 74a formed at substantially right angles to the side panels and second web or surface portion 66, 76 formed at right angles relative to the first web and extending relatively inwardly of and parallel to the side panel. The guide members 116 are of sufficient length to span the distance between the respective opposite first webs or front and rear surfaces of lips 60 and 74. Moreover, the guide members 116 include end portions 118, which are sized for a relatively close fit within the lips 60 and 74, that is, between webs 66, 74 and inner surfaces of the side panels. The guides 116 also have an intermediate, elongate flat support surface 120 for facing and abutting inner surfaces of the side panels 24, 26.

It will be seen that this configuration of the end portions 118 and support surface 120 of the guide member serves to provide additional support and rigidity to the side panels. It will also be noted that the guide members 110 and 112 advantageously provide such additional support and rigidity at midportions of the side panels 24 and 26, as best viewed for example in FIGS. 2 and 3. With respect to these latter guide members 110 and 112, suitable fasteners, indicated somewhat schematically at reference numerals 122, 124, secure these members to the respective side wall panels 24 and 26. However, advantageously, the fasteners or fastener means for securing the bottom guide members 114, 116 comprise the tie rods 36 and 40 which are assembled therewith as generally indicated in FIG. 9.

More specifically, each of the guide members, such as guide member 116 includes through apertures 130, 132 in its end portions 118 for receiving one or more fasteners, or alternatively, for receiving the tie rods 36 or 40 and mating fasteners 50 therethrough as shown in FIG. 7. Additional mating screws and nuts as generally indicated at 126 and 128 in FIG. 6 in phantom line may be added if desired to additionally secure the guides. In this regard, like fastener arrangements 122, 124 are preferably utilized in the same way as fasteners 126 and 128 for securing guides 110 and 112. That is, fasteners 122, 124 extend completely through the lip portions 74 and facing lip 72 of rear panel 70 to receive mating fasteners thereupon, further securing the lips 72 of rear panel 70 with facing lips 74 of side panels 24 and 26 at or about midportions thereof. However, the fasteners 122, 124 may alternatively comprise sheet metal screws or the like, if desired, extend through aligned through apertures 130 of the guide member 110, 112 to align and support the guide members in the desired position relative to the side walls 24, 26.

Preferably, the guide members are formed of a plastics material to facilitate relatively noise-free, low-friction sliding engagement with the respective file drawers 44 and 46. Moreover, it will be noted that the above arrangement of the lower tie rods 36, 40 and guide members 114 and 116 tends to form or define a relatively rigid, rectangular frame-like structure, thereby providing additional structural strength and integrity to the cabinet, especially about the bottom portion thereof.

Turning now to the construction of the drawers 44, 46 and their mounting for slidable movement relative to the guide members previously described, reference is invited to FIGS. 11–15. Each of these drawers, as best viewed in FIG. 1, with respect to drawer 44 is of a generally rectangular or rectilinear configuration, comprising respective front and rear panels 130, 132 and side panels 134, 136, and a bottom panel 138. Suitable coupling means are provided for joining these respective panels together to form the rectilinear drawer. These coupling means include, among other things, marginal web portions 140, 142 at bottom marginal edges of the side panels 134 and 136. In the illustrated embodiment, these web portions are formed generally at right angles to respective side panels 134 and 136 and face oppositely outwardly. Cooperatively, the coupling means also includes reversely bent gripping portions, designated in FIGS. 12 and 13 generally by reference numeral 144, formed at opposite side margins of the bottom panel 138 for grippingly engaging these side panel web portions 140.

Figures 12, 13, 14, 15:
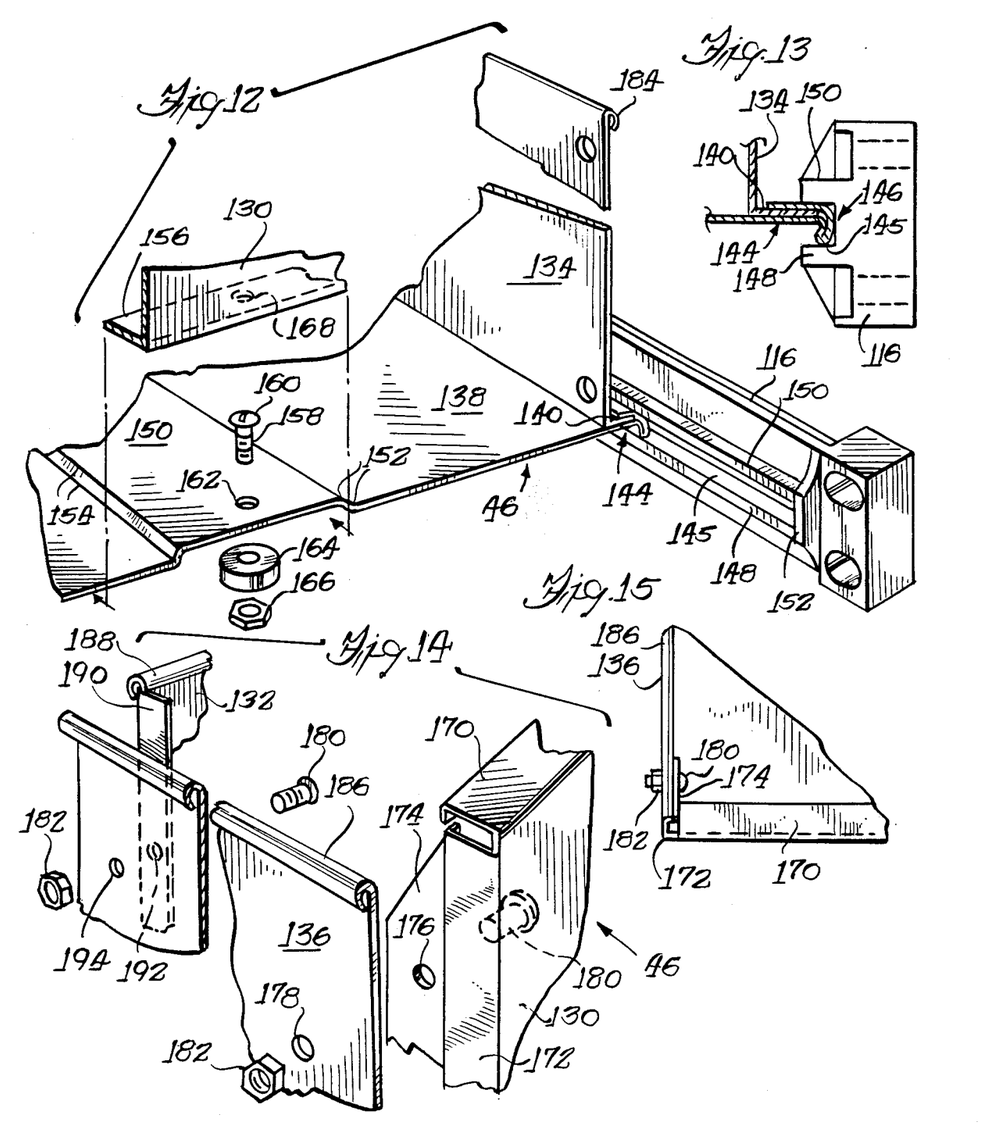
FIG. 12 is a partial, exploded perspective view illustrating further details of assembly of a drawer of the filing cabinet of the invention; and of sliding engagement thereof with the guide member of FIGS. 8 and 10.
FIG. 13 is a partial sectional view illustrating in further detail engagement of the drawer and guide of FIG. 12.
FIG. 14 is a partial, exploded perspective view illustrating further details of assembly of the drawer.
FIG. 15 is a partial top plan view of a front corner portion of an assembled drawer in accordance with the invention.

In accordance with a further feature of the invention, the reversely bent portions 144 of the bottom panel 138 are also formed so as to define elongate runner portions 146. These runners 146 have generally smooth, curvilinear surfaces, which extend generally oppositely outwardly for sliding engagement with the guide members, such as guide member 116 as illustrated in FIGS. 12 and 13. In this regard, it will be seen that each guide member such as guide 116 includes an elongate guide track or channel 145 formed by spaced parallel outward projecting, elongate extension portions or rails 148 and 150. Preferably, a rear end stop surface 152 is also provided in each of the guide members to define a fully closed position of the drawer relative to the cabinet 20. However, and referring briefly to FIG. 8, respective front ends of the guide members have no such abutment or stop surface, but rather the guide channel 145 is open-ended to permit ready insertion and removal of the drawers 44 and 46 with respect to the front opening 92 of the cabinet 20.

In the illustrated embodiment, the material at outer edges of bottom panel 138 is bent initially in a generally downwardly direction and then reversely bent back upwardly and finally inwardly to define the runner portion 146 for engagement with track 145. Moreover, the final or inwardly reversely bent portion of the material generally defines the gripping portion 144, which both opens and faces inwardly with respect to the side panels 134 and 136 for receiving the outwardly facing or projecting web portions 140 therewithin, and preferably for gripping the same to facilitate initial assembly thereof.

In accordance with a preferred form of the invention, the bottom panel 138 is also provided with an arched central surface portion 150 extending thereacross to provide additional structural rigidity thereto. In the illustrated embodiment, this arched surface portion 150 is defined by respective pairs 152 and 154 of generally symmetrically spaced and located parallel bends extending from the front to the rear of the bottom panel 138 and generally parallel with the lateral side edges or runner portions 146, so as to define a generally flat central web portion comprising surface 150 spaced from and parallel to the flat surface 138 of the bottom panel.

In the illustrated embodiment, the assembly of the drawers 44 and 46 and related features are preferably also as illustrated in FIGS. 11–15. That is, the front panel preferably has an inwardly bent or folded bottom margin or lip portion 156 which is configured to underlie the bottom panel 138. The rear panel 132 is preferably formed in similar fashion, such that only the formation and securement of front panel 130 is illustrated and described herein, it being understood that the formation and securement of rear panel 132 relative to bottom panel 138 is substantially identical. In this regard, a fastener assembly 155 extends through the arched central web portion, and preferably comprises a threaded screw-type fastener 158 with an enlarged head 160 for overlying and abutting a through aperture 162 in the arched surface or web portion 150. A washer-like spacer member 164 of suitable thickness to take up the space between raised web 150 and lip 156 is positioned therebetween to receive fastener 158 therethrough. Finally, a mating, nut-type fastener 166 is provided to threadably engage the fastener 158 where it protrudes through an aligned through aperture 168 provided in the lip 156 of front panel 130.

The front panel 138 further includes reversely bent top and side peripheral lips or margins 170, 172 as best viewed in FIG. 14. Each of the latter side margins or lips 172 further includes a generally inwardly stepped and rearwardly extending flange portion 174 for engaging and positioning side panels 134 and 136. As also shown in FIG. 15, for example, side panel 136 is positionable in alignment with the inwardly stepped back flange 174 and generally abutting and behind reversely bent lip 172. Thereupon, suitable screw and nut-type fastener assemblies 180, 182 may be utilized to secure side panel 136 to flange 174 at aligned through apertures 176, 178.

Preferably, the top edges of side panels 134 and 136 are provided with bent over lip or edge portions to avoid any protruding sharp edges or the like, as indicated generally by reference numerals 184 and 186. Similarly, rear panel 132 has a top bent over flange or lip portion 188. In similar fashion to the foregoing, rear panel 132 has inwardly extending flange or lip portions 190 which have through apertures 192 alignable with through apertures 194 in a rear portion of side panels 134 and 136 for receiving a further fastener 180 therethrough for engagement with a further mating fastener 182.

Accordingly, the knock-down file cabinet assembly may be readily assembled utilizing only a common screwdriver, generally in the following fashion. The drawers may be assembled as generally indicated above with reference to FIGS. 11–15 by first sliding the side panel flanges 140 into the receiving gripping portions or reversely bent edges 144 of the bottom panel 138. Thereupon, the front panel 138 may be slidably fitted in place with flanges 174 to the insides of respective side panels 134 and 136 and bottom lip or flange 156 beneath the bottom panel 138. The respective fastener assemblies 150, 164, 166 and mating fasteners 180 and 182 may then be placed and secured in the fashion illustrated and described above with reference to FIGS. 11–15.

The cabinet 20 may also be readily separately assembled, also requiring the use of only a screwdriver. Initially, the guide members or tracks 110, 112, etc., may be interfitted at the desired locations in side panel flanges or lip portions. Preferably, however, these guide members may be provided preassembled with these side panels, by use of fasteners 122 and 124 and the additional, optional fasteners 80, 82 mentioned above.

Thereupon, the mating fasteners 50 may be threadably affixed to one end of each of the tie rods preparatory to use thereof. Now the back panel is laid flat and one side panel brought into alignment therewith such that the through apertures are in alignment. Now the rear bottom elongate rod 36 with the mating fastener 50 on one end thereof may be pushed through these aligned through apertures, making sure that the rods go through the aligned one of the apertures 130, 132 provided in each of the guide members or drawer tracks 114, 116. At this time, the opposite side panel may be placed over the free threaded end of each rod and the opposite mating fastener 50 threadably engaged therewith through the aligned through apertures provided in the side panel as described above.

Next, the front bottom tie rod 40 may be inserted through aligned through apertures in the two side walls 24 and 26, and the kick plate is assembled over the tie rod as described above and between the side wall flange or lip portions. Now, the tie rod opposite end mating fastener 50 as well as additional fasteners 80 may be affixed to the kick plate as described above. Finally, the unit may be stood in an upright position and the top panel interfitted with the top ends or edges of the side panels in the manner indicated above, as generally illustrated in FIG. 5. At this point, the top front and rear tie rods 38 and 42 may be inserted through the respective aligned through apertures in the side and top panels provided therefor and the remaining mating fasteners 50 affixed.

If desired, an additional tie rod and mating fasteners, similar to those described above, may be inserted through an additional pair of aligned through apertures at midportions of the rear panel and side panels, utilizing the second of the two sets of apertures 130 and 132 of the guide members 110 and 112 located at the central portion to provide additional rigidity to the cabinet 20. Moreover, an additional tie rod may also be similarly placed at the front midportion if desired, for generally the same reasons. It will be noted that if such additional metal tie rods are utilized they will provide, together with the guide members 110 and 112, an additional, relatively rigid frame-like structure at generally a midportion of the cabinet 20. It should be noted, however, that suitable cutouts would be provided in the side flanges 172, 174 of the drawer front 130 of drawer 44, for example, to avoid interference with an additional, front middle tie rod member.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. An easily-assembled knock-down home filing cabinet comprising: a generally rectangular top panel; a pair of generally rectangular opposite side panels engaged at respective upper margins of said top panel in a parallel and spaced apart condition; and a plurality of elongate tie rod means spanning and joining said side panels intermediate areas thereof located generally adjacent respective corners thereof for maintaining the side panels in said parallel and spaced apart condition so as to define, with said top panel, a generally rectilinear cabinet for receiving at least one file drawer; each of said tie rod means comprising an elongate rod-like member having at least one threaded end; and a complementary mating theaded fastener for threaded engagement with each said rod threaded end and for engagement with an adjacent side panel; wherein each of said elongate rod-like members is threaded at both ends thereof and further including fastener-receiving means at each of the areas adjacent said four corners of said cabinet for receiving and engaging the respective mating fasteners; wherein said rod-like member opposite ends are both externally threaded, and wherein each of said mating fasteners comprises an elongate, tubular internally threaded portion for complementary engagement with one of said threaded rod ends and an enlarged head potion; said fastener-receiving means comprising aligned through apertures in said side panels for respectively receiving said tubular fastener portions therethrough with said fastener head portions engaging exterior surfaces of said cabinet about said through apertures.

2. An easily-assembled knock-down home filing cabinet comprising: a generally rectangular top panel; a pair of generally rectangular opposite side panels engaged at respective upper margins of said top panel in a parallel and spaced apart condition; and a plurality of elongate tie rod means spanning and joining said side panels intermediate areas thereof located generally adjacent respective corners thereof for maintaining the side panels in said parallel and spaced apart condition so as to define, with said top panel, a generally rectilinear cabinet for receiving at least one file drawer; each of said tie rod means comprising an elongate rod-like member having at least one threaded end; a complementary mating threaded fastener for threaded engagement with each said rod threaded end and for engagement with an adjacent side panel; at least one pair of parallel aligned guide members mounted against respective facing inner surfaces of said side panels for slidably receiving said at least one file drawer; and a generally rectilinear drawer comprising respective rear and front, bottom and opposite side panels, and coupling means for joining the respective panels together to form said rectilinear drawer; said coupling means including a marginal web portion at each lateral edge of said side panel formed at generally right angles thereto and a reversely bent gripping portion formed at each of opposite side margins of said bottom panel for slidably receiving and engaging said side panel web portions therein; wherein said bottom panel further includes a series of bends at the opposite side edges thereof defining outwardly and downwardly extending runner portions running from the front to the rear edge thereof for sliding engagement with said guide members, said series of bends further defining said gripping portions extending generally back inwardly of the lateral edges of said bottom panel for engagement with the webs of said side panels, the latter being oriented so as to face mutually oppositely outwardly for engagement with the gripping portions, which are inwardly opening and facing to receive and grip said webs.

3. An easily-assembled knock-down home filing cabinet according to claim 23 and further comprising guide members mounted against respective facing inner surfaces of said side panels for slidably receiving said at least one file drawer; wherein each of said side panels has, along at least front and rear edges thereof, marginal reversely bent lip portions comprising a first web formed at substantially right angles to the side panel and a second web formed at substantially right angles relative to the first web and extending relatively inwardly of and parallel to the side panel; and wherein said guide members are of sufficient length to span the distance between respective opposite first webs of each panel, and include respective end portions sized for a close fit within the lip formed by said first and second webs, and an intermediate elongate support surface facing and abutting inner surfaces of the respective sidewall panels to provide additional support and rigidity to said side panels.

4. A filing cabinet according to claim, 2 wherein each of said elongate rod-like members is threaded at both ends thereof and further including fastener-receiving means at each of the areas adjacent said four corners of said cabinet for receiving and engaging the respective mating fasteners.

5. A filing cabinet according to claim 2 and further including retaining means for maintaining said top and side panels in the desired alignment to define said generally rectilinear cabinet.

6. A filing cabinet according to claim 5 wherein said retaining means includes respective reversely bent lip portions at respective aligned front margins of said top and side panels; respective lateral outer edges of the lip portion of said top panel being cut away to define abutment surfaces for engagement with facing surfaces of said side panel lip portions to either side thereof so as to hold the same spaced apart and downwardly extending lip portions to either side of said top panel for embracing outer top surfaces of the side panels so as to define the spacing between said side panels at top portions thereof.

7. A filing cabinet according to claim 5 wherein said retaining means includes a generally rectangular rear panel engaged at a top margin thereof with said top panel and at opposite side margins thereof with the respective side panels for holding rear edges of the respective top and side panels in the desired relative orientation to at least partially define said rectilinear cabinet.

8. A filing cabinet according to claim 5 wherein said retaining means includes a front kick plate spanning said side panels at a lower portion thereof and defining together with said top and side panels a generally rectangular front opening for receiving at least one file drawer therein.

9. A filing cabinet according to claim 3 and further including fastener means for engaging and retaining said guide members in the desired locations relative to said side panels.

10. A filing cabinet according to claim 2 wherein said guide members are formed of a plastics material to facilitate relatively noise-free, low-friction sliding engagement with said at least one file drawer.

11. A filing cabinet according to claim 2 and further including two pairs of said guide members coupled to the respective sidewalls at vertically spaced locations for slidably receiving two drawers in said filing cabinet; and wherein a relatively lower one of said pairs of guide members have aligned through apertures at both front and rear portions thereof for receiving therethrough two of said tie rod means associated with the lower rear corners of said cabinet, both for retaining the guide members in the desired orientations relative to said side panels and for forming, together with said tie rods means, a relatively rigid, rectangular frame-like structure for providing additional structural strength to said cabinet.

12. A filing cabinet according to claim 2 and further including a generally rectilinear drawer comprising respective rear and front, bottom and opposite side panels, and coupling means for joining the respective panels together to form said rectilinear drawer; said coupling means including a marginal web portion at each lateral edge of said side panel formed at generally right angles thereto and a reversely bent gripping portion formed at each of opposite side margins of said bottom panel for slidably receiving and engaging one of said side panel web portions therein.

13. A filing cabinet according to claim 12 wherein said reversely bent portions of said bottom panel are further formed so as to define elongate runner portions having generally smooth, curvilinear surfaces extending oppositely outwardly for sliding engagement with said guide members.

14. A filing cabinet according to claim 12 wherein said bottom panel further includes an arched central surface portion extending thereacross to provide additional structural rigidity thereto.

15. A filing cabinet according to claim 14 wherein said bottom panel comprises a generally flat rectangular member defining front, rear and lateral edges relative to said cabinet and wherein said arched central portion is defined by respective pairs of generally symmetrically spaced and located parallel bends extending from front to back thereof and defining a central web portion which is generally spaced from and parallel to the remaining flat surface portion thereof.

16. A filing cabinet according to claim 12 wherein said bottom panel further includes a series of bends at the opposite side edges thereof defining outwardly and downwardly extending runner portions running from the front to the rear edge thereof for sliding engagement with said guide members, said series of bends further defining said gripping portions extending generally back inwardly of the lateral edges of said bottom panel for engagement with the webs of said side panels, the latter being oriented so as to face mutually oppositely outwardly for engagement with the gripping portions, which are inwardly opening and facing to receive and grip said webs.

17. A drawer construction for a home filing cabinet or the like comprising: respective rear and front, bottom and opposite side panels and coupling means for joining respective panels together to form a rectilinear drawer; said coupling means including a marginal web portion at a lower edge of each said side panel formed at generally right angles thereto and reversely bent gripping portions formed at opposite side margins of said bottom panel for slidably receiving and engaging the respective side panel web portions therein; wherein said bottom panel further includes a series of bends at the opposite side edges thereof defining outwardly and downwardly extending runner portions running from the front to the rear edge thereof for sliding engagement with complementary guide portions of the filing cabinet, said series of bends further defining said gripping portions extending generally back inwardly of the lateral edges of said bottom panel for engagement with the webs of said side panels, the latter being oriented so as to face mutually oppositely outwardly for engagement with the gripping portions which are inwardly opening and facing to receive the webs; and said runner portions being formed to present relatively smooth, continuously curved surfaces to said guide portions for freely sliding in relatively close engagement therewithin.

18. A drawer construction according to claim 17 wherein said bottom panel further includes an arched central surface portion extending thereacross to provide additional structural rigidity thereto.

19. A drawer construction according to claim 18 wherein said bottom panel comprises a generally flat rectangular member defining front, rear and lateral edges and wherein said arched central portion is defined by respective pairs of generally symmetrically spaced and located parallel bends extending from front to rear thereof and defining a central web portion which is generally spaced from and parallel to the remaining flat surface portion thereof.

20. A drawer construction according to claim 17 wherein said bottom panel further includes a series of bends at the opposite side edges thereof defining outwardly and downwardly extending runner portions running from the front to the rear edge thereof for sliding engagement with complementary guide portions of the filing cabinet, said series of bends further defining said gripping portions extending generally back inwardly of the lateral edges of said bottom panel for engagement with the webs of said side panels, the latter being oriented so as to face mutually oppositely outwardly for engagement with the gripping portions which are inwardly opening and facing to receive the webs.

* * * * *

UNITED STATES PATENT AND TRADEMARK OFFICE
CERTIFICATE OF CORRECTION

PATENT NO. : 4,712,844
DATED : December 15, 1987
INVENTOR(S) : John Fry

It is certified that error appears in the above-identified patent and that said Letters Patent is hereby corrected as shown below:

Claim 3, line 2, "23" should be --1--; before "guide", insert --at least one pair of parallel aligned--.

Claim 4, line 1, "claim, 2" should be --claim 1--.

Claim 5, line 1, "2" should be --1--.

Claims 10-12, inclusive, line 1, "2" should be --3--.

Signed and Sealed this

Twentieth Day of December, 1988

Attest:

DONALD J. QUIGG

*Attesting Officer*     *Commissioner of Patents and Trademarks*